United States Patent Office 2,827,964

Patented Mar. 25, 1958

2,827,964

SECONDARY RECOVERY OF PETROLEUM

Burton B. Sandiford, Placentia, and Howard F. Keller, Jr., Fullerton, Calif., assignors to Union Oil Company of California, Los Angeles, Calif., a corporation of California No Drawing. Application June 11, 1956
Serial No. 590,387

9 Claims. (Cl. 166—9)

This invention relates to the secondary recovery of petroleum from subterranean formations, and in particular concerns an improved water flooding process.

The technique of water flooding to recover oil from so-called "depleted" reservoirs is well known. In general, such process consists in introducing an aqueous medium into one or more injection wells which penetrate the "depleted" formation, and forcing such medium through the formation toward one or more production wells which likewise penetrate the formation. In the so-called "five-spot drive," the aqueous medium is forced down four injection wells which are more or less symmetrically located around a producing well. As the flooding medium passes through the formation it displaces the residual oil therein and carries it into the producing well from which it is recovered by conventional means. In order to insure that the flooding medium advances through the formation to the production well with a more or less plane front (rather than in the form of fingers extending through the strata of highest permeability), it has been proposed that the viscosity of at least the forward portion of the flooding medium be adjusted so as to be of the order of, or greater than, that of the oil to be recovered. This has been accomplished by adding a viscosity-increasing agent to at least the initial portion of the flooding medium. Fatty acid soaps, alginates, sucrose, glycerine, carboxymethylcellulose and water-soluble polymers such as polyvinyl and polyallyl alcohols have been suggested for use as such agents in aqueous flooding media. Certain of such agents, however, precipitate from solution when exposed to typical reservoir temperatures and/or to the anions or cations normally present in subterranean formations, whereas others must be employed in very large amounts to secure the desired increase in viscosity.

The present invention is based on our discovery that certain water-soluble partially hydrolyzed acrylamide polymers are particularly well adapted for use as viscosity-increasing additives in aqueous flooding media, and that increased recovery of oil can be realized by the above described flooding or driving techniques employing a viscous aqueous solution of such agent as the flooding or driving medium. Such polymers are exceptionally stable with respect to precipitation from aqueous solutions by heat and/or mineral anions and cations, and relatively small amounts are effective in achieving the desired increase in viscosity. The invention thus consists in a secondary recovery process in which a flooding medium consisting essentially of a viscous aqueous solution of a water-soluble partially hydrolyzed acrylamide polymer of the type hereinafter described is injected into an input well which penetrates an oil-bearing formation and is thereafter forced through said formation toward an output well penetrating the same. In the interests of economy, it is preferred to employ the viscous flooding medium as a relatively small volume plug in advance of a conventional non-viscous flooding medium, e. g., water.

The partially hydrolyzed acrylamide polymers which are employed in accordance with the invention are water-soluble acrylamide polymers which have been hydrolyzed to such an extent that between about 0.8 and about 10 percent of the amide groups have been converted to carboxyl groups. As herein employed, the term "acrylamide polymer" is inclusive of the homopolymers of acrylamide, i. e., polyacrylamide, and water-soluble copolymers of acrylamide with up to about 15 percent by weight of other polymerizable vinyl compounds such as the alkyl esters of acrylic and methacrylic acids, methacrylamide, styrene, vinyl acetate, acrylonitrile, methacrylonitrile, vinyl alkyl ethers, vinyl chloride, vinylidene chloride, etc. Such copolymers are conventionally obtained by subjecting a suitable mixture of the monomers to polymerizing conditions, usually under the influence of a polymerization catalyst such as benzoyl peroxide. In addition to the aforementioned limitation on the extent of hydrolysis, the acrylamide polymers suitable for use in accordance with the invention are of sufficiently high molecular weight that a 0.5 percent by weight aqueous solution thereof has a viscosity of at least about 4, preferably at least about 10, centipoises (Ostwald) at 21.5° C. In order to facilitate ready solution of the polymer in the aqueous flooding medium it is preferable that it be employed in finely-divided form. The general manner in which acrylamide is polymerized or copolymerized and thereafter partially hydrolyzed to form the present viscosity-increasing additives is well known in the polymer art. Preferably the polymerization or copolymerization is controlled through the use of specific polymerization catalysts and/or specific conditions of temperature and pressure to form long chain polymeric molecules which are characterized by a minimum of cross-linkages. The molecular weight is likewise controlled by varying the polymerization conditions and/or the catalyst employed. Hydrolysis of the polymers is accomplished by reacting the polymer with sufficient of a base, e. g., sodium hydroxide, to hydrolyze between about 0.8 and about 10 percent of the amide groups present in the polymer molecule. The resulting product consists of a long hydrocarbon chain the alternate carbon atoms of which bear either amide or carboxylic groups, with the ratio of amide to carboxylic groups being between about 9/1 and about 124/1. A number of partially hydrolyzed acrylamide polymers suitable for use in practice of the invention are commercially available, one of such products being marketed by The Dow Chemical Company under the trade name "Separan."

The amount of polymer employed in practicing the process of the invention should be such that the viscosity of the aqueous flooding medium at the reservoir temperature is at least about 1 centipoise and is preferably more or less equal to or greater than the viscosity of the residual oil in the formation, e. g., between about 10 and about 1000 centipoises. The exact amount required is dependent upon the molecular weight of the polymer and the extent to which it has been hydrolyzed, as well as upon the presence or absence of other additives in the flooding medium. Usually, however, such amount represents between about 0.1 and about 1.5 percent by weight of the entire composition. In accordance with conventional water flooding practice the flooding medium may optionally contain minor amounts of other additives adapted to impart specific desirable properties to the medium. Among such optional additives there may be mentioned surface active or wetting agents, e. g., alkyl pyridinium salts, sorbitan, mono-oleate, quaternary ammonium compounds and the like, which are provided for the purpose of improving the contact between the aqueous flooding medium and the oil-wet particles of the formation; bactericides such as chlorinated phenols, aldehydes, and the like, which serve to prevent bacterial growth from clogging the interstices of the formation; corrosion inhibitors; etc.

In carrying out the process of the invention, conventional water flooding procedure is employed, i. e., the injection and production wells are suitably fitted with packers if required, and the viscous flooding medium is forced down the injection well and out into the reservoir by means of conventional pumping equipment located at the well head. As previously stated, in the interests of economy it is preferred to employ the viscous flooding medium only to form a flooding front and to follow the viscous medium with ordinary flooding water. Accordingly, after the viscous medium has been forced into the injection wells for a period of time sufficient to insure an adequate thickness of viscous flooding front within the formation, its supply is cut off and ordinary flooding water is substituted therefor. The amount of viscous medium necessary to provide a flooding front of adequate thickness will depend upon the distance between the injection and producing wells and their spacing, as well as upon the porosity of the intervening formations. Desirably, the volume of viscous flooding medium should correspond to between about 1 and about 10 percent of the volume of the hydrocarbon pore space of the formation, although larger volumes may be employed.

In order to demonstrate the improved results attained through the use of partially hydrolyzed acrylamide polymers in accordance with the process of the invention, and to provide a reliable means for comparing the efficiency of such polymers with other viscosity-increasing agents, the following test procedure has been employed: A core sample, about 1" in diameter by about 2" in length, is mounted in a core holder equipped with pressure fittings on its opposite faces so that desired liquids can be forced lengthwise through the core. The latter is initially saturated with a simulated oil field brine consisting of a 3 percent aqueous solution of sodium chloride, after which a hydrocarbon oil is forced into one end of the core until brine is no longer forced out of the core at the opposite end. The volume of oil thus forced into and retained within the core sample is noted and designated $V_0$. The core sample so prepared is referred to as a "restored state" core since it simulates the saturation condition which prevailed in the original formation. A simulated conventional flooding operation is then carried out by forcing a conventional flooding medium (which may be water or brine) through the core until breakthrough occurs. The volume of oil which is thereby forced from the discharge end of the core is determined and designated $V_1$. The simulated flooding operation is then continued until oil is no longer forced from the discharge end of the core. The total volume of oil thus forced from the core is determined and designated $V_2$. The efficiency of the operation up to breakthrough is calculated as follows $$\frac{V_1}{V_0}\times 100=E_B$$

and the overall efficiency is calculated as $$\frac{V_2}{V_0}\times 100=E_O$$

Oil is again forced through the core until the flooding medium is no longer forced from the discharge end of the core, and the amount of oil thus retained within the core is determined and designated as $V_0'$. The simulated flooding operation is then repeated with the viscous test medium substituted for the conventional flooding medium, and the amount of test medium forced into the core up to breakthrough is determined and designated $V_1'$. Also, the amount of the test flooding medium forced into the core until oil is no longer forced from the discharge end thereof is determined and designated $V_2'$. The breakthrough and overall efficiencies are calculated as $E_B'$ and $E_O'$ as previously explained. The ratios $E_B'/E_B$ and $E_O'/E_O$ are a measure of the improvement in oil recovery secured by use of the viscous test medium.

The following table sets forth the data obtained by subjecting typical partially hydrolyzed acrylamide polymers (abbreviated "PAM") and several of the prior art viscosity-increasing additives to the foregoing test procedure.

| Test No. | Test Material | $E_B$ | $E_O$ | $E_B'$ | $E_O'$ | $E_B'/E_B$ | $E_O'/E_O$ | Remarks |
|---|---|---|---|---|---|---|---|---|
| 1 | 1% Aqueous PAM; visc.=49 cps.; Ohio sandstone core; visc. of oil=2 cps. | 33.0 | 41.0 | 33.0 | 53.0 | 1.00 | 1.60 | |
| 2 | 2% Aqueous polyvinyl alcohol, visc.=4.6 cps.; Ohio sandstone core; visc. of oil=2 cps. | 49.0 | 51.0 | 55.0 | 55.0 | 1.04 | 1.08 | Test solution foamed badly, and gradually plugged core. |
| 3 | 0.75 Aqueous PAM, visc.=23 cps.; Nevada-70 sand core; visc. of oil=207 cps. | 23.0 | 67.0 | 41.0 | -------- | 1.78 | -------- | Test stopped at breakthrough point. |
| 4 | 1% Aqueous PAM, visc.=49 cps.; Ohio sandstone core; visc. of oil=207 cps. | 23.0 | 40.0 | 36.0 | 45.0 | 1.56 | 1.12 | |
| 5 | 2% Aqueous PAM, visc.=34 cps.; Nevada-70 sand core; visc. of oil=207 cps. | 23.0 | 67.0 | 44.0 | 73.0 | 1.91 | 1.66 | |
| 6 | 1% Aqueous methyl cellulose, visc.=30 cps.; Nevade-70 sand core; visc. of oil=207 cps. | 23.0 | 67.0 | 0.5 | -------- | 0.22 | 0 | Core completely plugged by test medium. |

Of the various materials suggested by the prior art as viscosity-increasing additives for aqueous flooding media, polyvinyl alcohol is the most closely related to the partially hydrolyzed acrylamide polymers which are employed for such purpose in accordance with the present invention. However, as is established by the experimental data tabulated above, when an aqueous solution of polyvinyl alcohol is forced through an oil sand the polyvinyl alcohol precipitates in solid form and gradually plugs the sand to shut off the flow of fluids therethrough. Also, polyvinyl alcohol is not particularly effective for increasing the viscosity of water; in the tests referred to above, a 2 percent aqueous solution of the same had a viscosity of only 4.6 cps. Clearly, if viscosities of the order of 10–100 cps. are to be attained it will be required to employ an uneconomically large amount of polyvinyl alcohol. Also, polyvinyl alcohol solutions have a tendency to foam, which makes such solutions difficult to handle and, furthermore, decreases the efficiency of oil displacement. It may also be noted that carboxymethylcellulose, which has also been suggested as a viscosity-increasing additive, was found to be even less satisfactory than ordinary brine since it precipitated from solution within the core and completely plugged the same.

Other modes of applying the principle of our invention may be employed instead of those explained, change being made as regards the methods or materials employed provided the step or steps stated by any of the following claims, or the equivalent of such stated step or steps, be employed.

We, therefore, particularly point out and distinctly claim as our invention:

1. The process for recovering oil from a substerranean oil-bearing formation which comprises introducing into an input well penetrating said formation a flooding medium consisting essentially of an aqueous solution of a water-soluble partially hydrolyzed acrylamide polymer, and forcing said medium through said formation toward at least one output well penetrating said formation at a distance from said input well, said polymer having a molecular weight such that a 0.5 percent by weight aqueous solution of the same has a viscosity of at least about 4 cps. Ostwald at 21.5° C. and being hydrolyzed to such an extent that between about 0.8 and about 10 percent of the amide groups originally present in the unhydrolyzed polymer have been converted into carboxyl groups, and said polymer being employed in such amount that the said flooding medium has a viscosity between about 1 and about 1000 cps. at the formation temperature.

2. The process of claim 1 wherein the said polymer is water-soluble partially hydrolyzed polyacrylamide.

3. The process of claim 1 wherein the said polymer is employed in such amount that the viscosity of the said flooding medium at the formation temperature is between about 10 and about 1000 cps.

4. The process of claim 1 wherein the molecular weight of said polymer is such that a 0.5 percent by weight aqueous solution of the same has a viscosity of at least about 10 cps. Ostwald at 21.5° C.

5. The process for recovering oil from a subterranean oil-bearing formation which comprises introducing into an input well penetrating said formation a flooding medium consisting essentially of an aqueous solution of a water-soluble partially hydrolyzed acrylamide polymer, said solution being of such concentration that it has a viscosity of at least about 1 cps. at the formation temperature and said polymer having a molecular weight such that a 0.5 percent by weight aqueous solution of the same has a viscosity of at least about 4 cps. Ostwald at 21.5° C. and being hydrolyzed to such an extent that between about 0.8 and about 10 percent of the amide groups originally present in the unhydrolyzed polymer have been converted to carboxyl groups; and thereafter introducing water into said input well under sufficient pressure to force said flooding medium through said formation toward at least one output well penetrating said formation at a distance from said input well, thereby displacing the oil in said formation by said flooding medium and in turn displacing said flooding medium by said water.

6. The process of claim 5 wherein said polymer is water-soluble partially hydrolyzed polyacrylamide.

7. The process of claim 5 wherein the volume of said flooding medium employed is between about 1 and about 10 percent of the hydrocarbon pore space of said formation.

8. The process of claim 5 wherein said polymer is water-soluble partially hydrolyzed polyacrylamide of such molecular weight that a 0.5 percent by weight aqueous solution of the same has a viscosity of at least about 10 cps. Ostwald at 21.5° C.

9. The process of claim 8 wherein said polymer is employed in such amount that the viscosity of said flooding medium at the formation temperature is between about 10 and about 1000 cps.

References Cited in the file of this patent

UNITED STATES PATENTS

| | | |
|---|---|---|
| 2,718,497 | Oldham et al. | Sept. 20, 1955 |
| 2,731,414 | Binder | Jan. 17, 1956 |
| 2,771,138 | Beeson | Nov. 20, 1956 |